(12) United States Patent
Bastide et al.

(10) Patent No.: US 10,140,274 B2
(45) Date of Patent: Nov. 27, 2018

(54) AUTOMATED MESSAGE MODIFICATION BASED ON USER CONTEXT

(71) Applicant: International Business Machines Corporation, Armonk, NY (US)

(72) Inventors: Paul R. Bastide, Boxford, MA (US); SathyaNarayanan Srinivasan, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/418,884

(22) Filed: Jan. 30, 2017

(65) Prior Publication Data

US 2018/0217968 A1    Aug. 2, 2018

(51) Int. Cl.
G06Q 30/02      (2012.01)
G06F 17/24      (2006.01)
H04L 12/58      (2006.01)
G06F 17/27      (2006.01)

(52) U.S. Cl.
CPC ........ *G06F 17/241* (2013.01); *G06F 17/2785* (2013.01); *H04L 51/02* (2013.01); *H04L 51/04* (2013.01)

(58) Field of Classification Search
CPC .............................. G06F 3/048; G06F 17/2264
See application file for complete search history.

(56) References Cited

U.S. PATENT DOCUMENTS

| | | | |
|---|---|---|---|
| 6,598,020 B1 | 7/2003 | Kleindienst et al. | |
| 7,743,340 B2* | 6/2010 | Horvitz | G05B 19/404 |
| | | | 715/710 |
| 7,958,032 B2 | 6/2011 | Schimpf et al. | |
| 8,233,887 B2 | 7/2012 | Whitney et al. | |

(Continued)

FOREIGN PATENT DOCUMENTS

WO    2013074960 A1    5/2013

OTHER PUBLICATIONS

Osman et al.; "Mobile Phone Short Message Tacton Notification Based on Mood and Urgency", Have IEEE International Symposium on, Oct. 10-11, 2014, pp. 76-81.

(Continued)

*Primary Examiner* — Shreyans A Patel
(74) *Attorney, Agent, or Firm* — L. Jeffrey Kelly; SVL IPLaw

(57) ABSTRACT

According to an embodiment of the present invention, a system dynamically modifies an incoming message based on the context of the message and the user receiving the message. Initially, a server receives an incoming message directed to a user of a digital device, and analyzes the incoming message to determine a message content associated with the message and a user context based on one or more environmental parameters associated with the user. A processor in the server determines whether the incoming message should be modified based on the message content and user context, and, in response, generates a modified message for display to the user in accordance with the (Continued)

message content and the user context. Embodiments of the present invention further include a method and computer program product for dynamically modifying a message based on the context of the user in substantially the same manner described above.

13 Claims, 9 Drawing Sheets

(56) References Cited

U.S. PATENT DOCUMENTS

| | | |
|---|---|---|
| 8,271,902 B1 | 9/2012 | Mangini et al. |
| 8,509,743 B2 | 8/2013 | Bychkov et al. |
| 8,707,201 B1 | 4/2014 | Aradhye et al. |
| 9,185,084 B1 | 11/2015 | Daniel |
| 9,235,711 B1 | 1/2016 | Xavier |
| 9,277,375 B2 | 3/2016 | Uusitalo et al. |
| 2006/0248183 A1 | 11/2006 | Barton |
| 2007/0113181 A1 | 5/2007 | Blattner et al. |
| 2008/0148148 A1 | 6/2008 | Ramanathan et al. |
| 2008/0294741 A1 | 11/2008 | Dos Santos et al. |
| 2009/0013052 A1* | 1/2009 | Robarts ............ G06F 17/30867 709/206 |
| 2011/0092221 A1* | 4/2011 | Zubas ............... H04M 1/72547 455/456.1 |
| 2011/0316702 A1* | 12/2011 | Chuang ............. G08B 21/0446 340/573.1 |
| 2012/0151381 A1* | 6/2012 | Schiff ....................... G06F 8/34 715/752 |
| 2012/0182309 A1 | 7/2012 | Griffin et al. |
| 2012/0280951 A1 | 11/2012 | Bychkov et al. |
| 2013/0297284 A1* | 11/2013 | Choi ....................... G06F 17/28 704/2 |
| 2013/0346515 A1* | 12/2013 | DeLuca ................. G06Q 50/01 709/206 |
| 2014/0095151 A1* | 4/2014 | Sakamoto ............ G06F 17/274 704/9 |
| 2014/0364081 A1* | 12/2014 | Rauner ............... H04L 12/1895 455/404.2 |
| 2015/0118663 A1 | 4/2015 | Levy et al. |
| 2015/0304300 A1 | 10/2015 | Bender |
| 2016/0110059 A1 | 4/2016 | Li et al. |
| 2016/0188387 A1 | 6/2016 | Yang |

OTHER PUBLICATIONS

Oh et al.; "An Intelligent Notification System Using Context From Real-Time Personal Activity Monitoring", ICME IEEE International Conference on, Jun. 29-Jul. 3, 2015, pp. 1-6.

Church et al.; "A Study of Mobile Mood Awareness and Communication Through MobiMood", NordiCHI'10 ACM 6th Nordic Conference on, Oct. 16-20, 2010, pp. 128-137.

* cited by examiner

AUTOMATED MESSAGE MODIFICATION BASED ON USER CONTEXT

BACKGROUND

1. Technical Field

Present invention embodiments relate to messaging systems, and more specifically, to dynamic message modification based on message content and user context.

2. Discussion of the Related Art

Smartphone users receive numerous notifications of various contexts, including those of a personal, sensitive or embarrassing nature. These notifications often arrive before a user can take action to prevent accidental disclosure of the notification, possibly causing embarrassment to the user. Smartphone users therefore confront potential major privacy issues whenever they are in a public environment and have enabled notification preview on the screens of their digital devices. Unfortunately, smartphones lack the sophisticated intelligence to adequately protect the privacy interests of their users.

SUMMARY

According to an embodiment of the present invention, a system dynamically modifies an incoming message based on user context. Initially, a processor analyzes an incoming message directed to a user to determine a message content associated with the incoming message and a user context is determined based on one or more environmental parameters associated with the user. The processor then determines whether the incoming message should be modified based on the message content and user context, and, in response to determining that the message should be modified, generates a modified message based on the message content and the user context for display to the user. Embodiments of the present invention further include a method and computer program product for dynamically modifying an incoming message based on user context in substantially the same manner described above.

DETAILED DESCRIPTION

Figure 1:
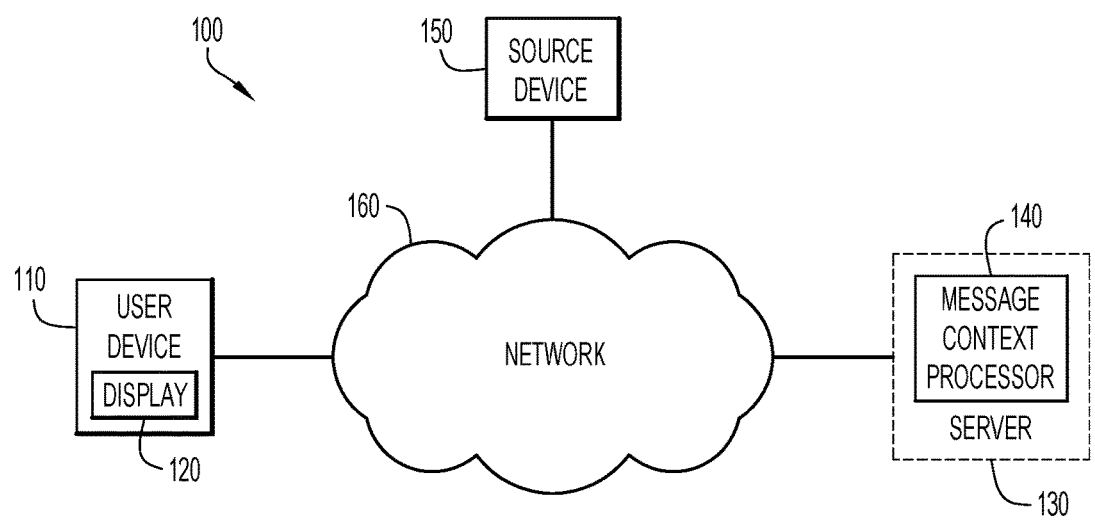
FIG. 1 is a diagrammatic illustration of an example computing environment for use with an embodiment of the present invention.

Present invention embodiments dynamically capture and modify one or more messages directed to a user device. Initially, a server receives and analyzes an incoming message to determine, based on one or more environmental parameters and a pre-configured set of user preferences, whether to modify the incoming message before forwarding it to a user device for display to a user. A processor in the server uses Natural Language Processing (NLP) techniques to determine the message content of the incoming message and, based on the message content, determines a message sentiment or mood associated with the incoming message. After determining the message content and the message sentiment, the processor may select a pre-configured template in accordance with the message sentiment and generate a message notification by modifying the selected template to summarize the message content. In this fashion, sensitive or embarrassing information is withheld from the message notification displayed on a user device.

A user profile database may store profile attributes associated with a user of a user device. For example, the profile database may include configuration information associated with user preferences, e.g., preferred message notification format, preferred security level, etc. The profile database may further comprise environmental information associated with a user device, e.g., public or private location, shared terminal, locked status, etc. According to an embodiment, a message notification is constructed from an incoming message based on the environmental and configuration information stored in the user profile database.

Analysis techniques may further transform a determined message content and sentiment into pre-configured colors to convey or indicate the gist of the message content or signal the message sentiment or mood to a user receiving a message notification. For example, a message context processor may generate a message notification by making the background color of the notification red, indicating to a user that a received message is of critical importance and/or is of a sensitive nature. A message context processor may further construct a message structure, based on the message content, to include one or more objects and/or symbols to convey or indicate the message content and/or message sentiment of the received message. For example, a notification of an incoming message may comprise a smiling emoticon or a picture of someone laughing to convey a positive or happy message sentiment to a user.

Present invention embodiments utilize text analytics to transform an incoming message into a modified message notification that omits embarrassing, personal or sensitive information. The modified message notification is generated based on pre-configured preferences or environmental factors, which may include a textual summary of the incoming message, and objects and/or images to convey and/or indicate both a message content and sentiment to a user receiving the notification. For example, contextual information associated with an incoming message may be analyzed and, depending on one or more user preferences, conveyed or indicated in a message notification displayed on a user device. In so doing, an incoming message directed to a user is intercepted during its transmission and modified before being transmitting to the user. The disclosed embodiments may therefore facilitate secure communications, making it easier for users to share confidential information without concern for inadvertent disclosure or leakage, regardless of the environment in which the message notification is displayed.

An example computing environment for use with present invention embodiments is illustrated in FIG. 1. Specifically, environment 100 includes a user device 110, one or more servers 130, and one or more source devices 150. User device 110 may comprise one or more displays 120 for displaying one or more message notifications received from server 130. Server 130 may comprise one or more message context processors 140, which are responsible for modifying an incoming message based on previously stored user preferences and/or environmental parameters associated with user device 110. Server 130 and user device 110 may be remote from each other and communicate over a network 160. Network 160 may be implemented by any number of any suitable communications media (e.g., wide area network (WAN), local area network (LAN), Internet, Intranet, etc.). Alternatively, server 130 and user device 110 may be local to each other, and communicate via any appropriate local communication medium (e.g., local area network (LAN), hardwire, wireless link, Intranet, etc.).

User device 110 enables users to receive one or more message notifications based on one or more messages received at server 130. For example, user device 110 may receive a modified message notification indicating that server 130 has received an important medical-related message for the user. According to a present invention embodiment, a user may request to receive an unmodified incoming message associated with a message notification received from server 130 in response to receiving a message notification indicating receipt of the incoming message.

Initially, server 130 receives an incoming message from source device 150 that is directed to a user associated with user device 110. After receiving the incoming message from source device 150, server 130 stores the incoming message and forwards it to message context processor 140. Message context processor 140, using NLP techniques, analyzes the message to determine both a message content and message sentiment associated with the incoming message. For example, context processor 140 may use Alchemy Application Programming Interface (API) or Watson Developer Cloud cloud-based services to perform NLP analytics and contextual analysis to determine a message content of an incoming message, and may further use IBM's Watson Message Sentiment services to perform sentiment analysis to determine the sentiment or mood of an incoming message. Server 130 may further evaluate one or more preconfigured characteristics or preferences associated with the user, and one or more environmental parameters associated with user device 110, to determine whether to generate a modified message notification based on the incoming message for display to the user.

Server 130 may further generate a modified message notification by selecting a pre-configured message template based on the message content and/or message sentiment associated with an incoming message. The pre-configured template is modified based on the message content, as well as one or more preconfigured characteristics or preferences associated with the user and one or more environmental parameters associated with user device 110. For example, server 130 may receive a medical-related message directed to the user, and based on the message content and message sentiment determined by message context processor 140, select a pre-configured template indicating a medical-related message. The pre-configured template is modified to include contextual information and/or symbols indicating a generalized message content associated with the incoming message, thereby preventing the unwanted leakage of sensitive medical-related information. Server 130 may further generate a message notification to include one or more symbols, e.g., emoticons, and/or a background color based on the message sentiment associated with the incoming message. According to a present embodiment, the user may provide feedback to server 130 indicating the clarity and/or sufficiency of the modified message notification. Server 130 may store the feedback received from the user, and, based on the received feedback, message context processor 140 may, using machine learning techniques, update one or more dictionaries used to analyze one or more incoming messages and generate modified message notifications.

Figure 2:
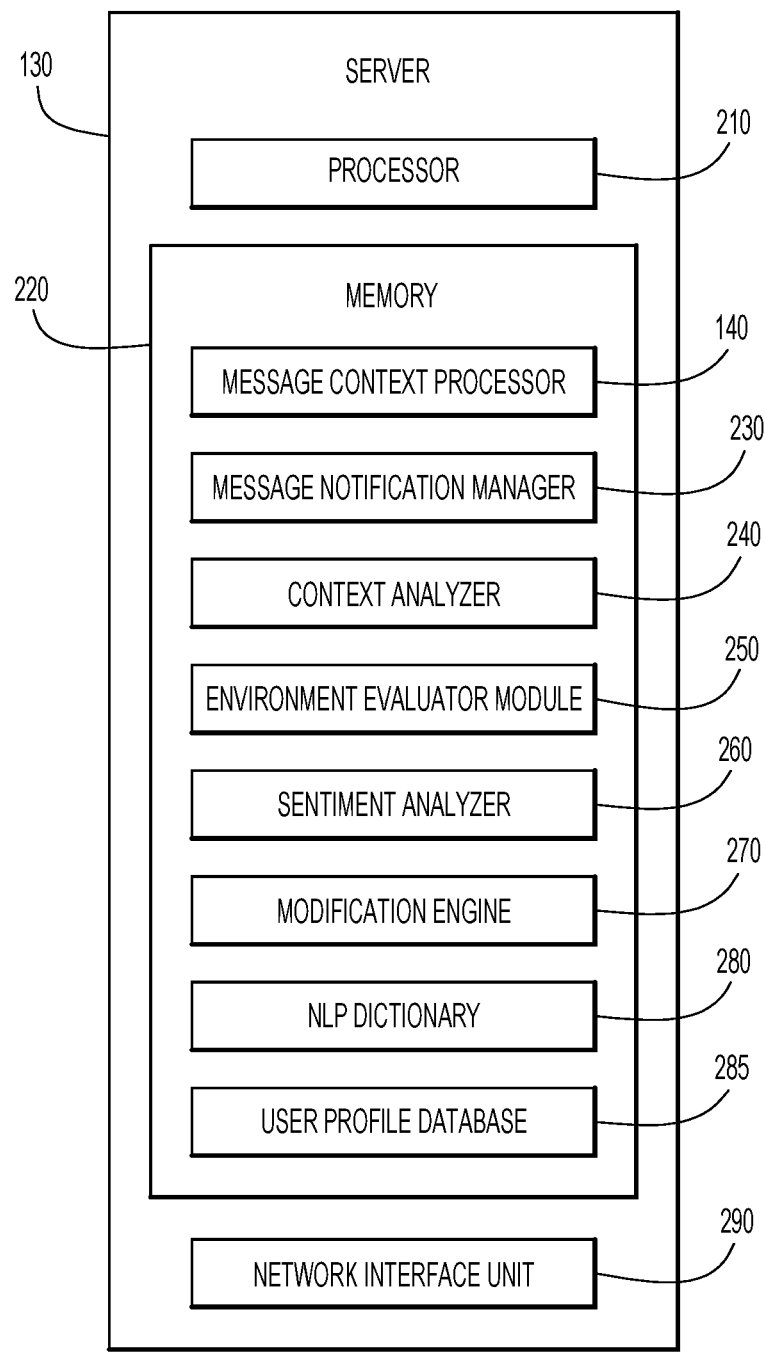
FIG. 2 is a block diagram illustrating the server of FIG. 1 in more detail according to an embodiment of the present invention.

Reference is now made to FIG. 2, which shows an example block diagram of server 130 configured to perform message processing according to present invention embodiments. It should be understood that there are numerous possible configurations for server 130 and FIG. 2 is meant to be an example of one of the possible configurations. Server 130 includes a processor 210, memory 220 and a network interface unit 290. The network interface (I/F) unit (NIU) 290 is, for example, an Ethernet card or other interface device that allows the server 130 to communicate over communication network 160. Network I/F unit 290 may include wired and/or wireless connection capabilities.

Processor 210 may include a collection of microcontrollers and/or microprocessors, for example, each configured to execute respective software instructions stored in the memory 220. Portions of memory 210 (and the instructions therein) may be integrated with processor 210.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 220 may comprise one or more computer readable storage media (e.g., a memory device) encoded with software comprising computer executable instructions and when the software is executed (e.g., by processor 210) it is operable to perform the operations described herein. For example, memory 220 stores or is encoded with instructions or modules for message context processor 140, which is configured to analyze one or more incoming messages to determine whether the one or more messages should be modified before being forwarded to user device 110 for display to a user. Optionally, user device 110 and/or server 130 may, individually or in combination, include message context processor 140 to perform the message analysis to determine whether one or more messages should be modified according to the subjective preferences of the user and/or one or more environmental parameters associated with user device 110.

Memory 220 may further store or is encoded with instructions for message notification manager 230, context analyzer 240, environmental evaluator module 250, sentiment analyzer 260, modification engine 270, NLP Dictionary 280 and user profile database 285. Message notification manager 230 is further configured to send one or more requests to user device 110 for user profile information, including one or more characteristics or preferences associated with a user of user device 110, one or more environmental parameters associated with user device 110 and/or feedback information associated with one or more message notifications previously sent to user device 110. Message notification manager 230 stores the received user profile information in user profile database 285 for message processing operations.

Context analyzer 240 may use NLP techniques to parse one or more incoming messages to determine the contextual meaning associated with the one or more incoming messages. For example, if server 130 receives an incoming message of "this client is difficult," contextual analyzer 240 may determine that the incoming message is business-related and refers unfavorably to an existing or potential client. Similarly, if server 130 receives an incoming message "Mom fell down, unable to reach you," contextual analyzer 240 may, e.g., by using NLP techniques, determine that the incoming message is of a personal nature and refers to the medical condition of a close family member, i.e., a user's mother.

Environmental evaluator module 250 uses one or more environmental parameters to identify and categorize the ecosystem in which user device 110 is located, e.g., a public or private location, as well as one or more attributes associated with the user display, e.g., a shared or private display, and the local area network to which the user device is connected, e.g., a public or private network. Sentiment analyzer 260 analyzes the message context determined by context analyzer 240 to identify the primary sentiment and/or mood associated with the message context of an incoming message. For example, if context analyzer 240 determines that an incoming message is "Mom fell down, unable to reach you," sentiment analyzer 260 may determine that the primary sentiment or mood associated with the incoming message is a personal message that is of a critical and/or of a sensitive nature.

Modification engine 270 determines whether the message content of an incoming message should be modified. This determination is based on the message content and message sentiment associated with the incoming message, as well as pre-configured characteristics or preferences associated with the user receiving the message and one or more environmental parameters associated with user device 110. If it is determined that the incoming message should be modified, modification engine 270 is further configured to generate a modified message notification based on the message context and message sentiment associated with the incoming message. For example, if an incoming message is "Mom fell down, unable to reach you," modification engine 270 may generate a modified message notification indicating that the user has "received a critical health update about Mom." Modification engine 270 may be further configured to include one or more symbols, e.g., emoticons, and/or a background color, in a modified message notification, based on the message sentiment associated with the incoming message.

Message notification manager 230, context analyzer 240, environment evaluator module 250, sentiment analyzer 260 and modification engine 270 may include one or more modules or units to perform the various functions of present invention embodiments described below. The various modules (e.g., message notification manager, context analyzer, environment evaluator module, sentiment analyzer, modification engine, etc.) may be implemented by any combination of any quantity of software and/or hardware modules or units, and may reside within memory 220 of server 130 for execution by processor 210.

Memory 220 may provide NLP dictionary 280, which may comprise one or more dictionaries that store various terms and meanings used and received by context analyzer 260 for contextual analysis of a message associated with a user of user device 110. For example, NLP dictionary 280 may store one or more definitions and/or synonyms associated within one or more words, terms and/or phrases included in the incoming message. Message notification manager 230 and/or context analyzer 240 may update one or more definitions and/or synonyms based on feedback information received from a user associated with user device 110. NLP dictionary 280 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Memory 220 may further provide user profile database 285, which stores various information used and received by message notification manager 230 for contextual analysis of a message associated with a user of user device 110. For example, user profile database 285 may store one or more characteristics or preferences associated with a user (e.g., security preferences, personal sensitivity, etc.), and/or one or more environmental parameters associated with device 110 (e.g., public environment, shared screen, screen unlocked, public network, etc.). User profile database 285 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Server 130 may be implemented by any conventional or other computer systems preferably equipped with a display or monitor, a base (e.g., including at least one processor 210, one or more memories 220 and/or internal or external network interfaces or communications devices 290 (e.g., modem, network cards, etc.), optional input devices (e.g., a keyboard, mouse or other input device), and any commercially available and custom software (e.g., server/communications software, activity context processor module, etc.).

Figure 3:
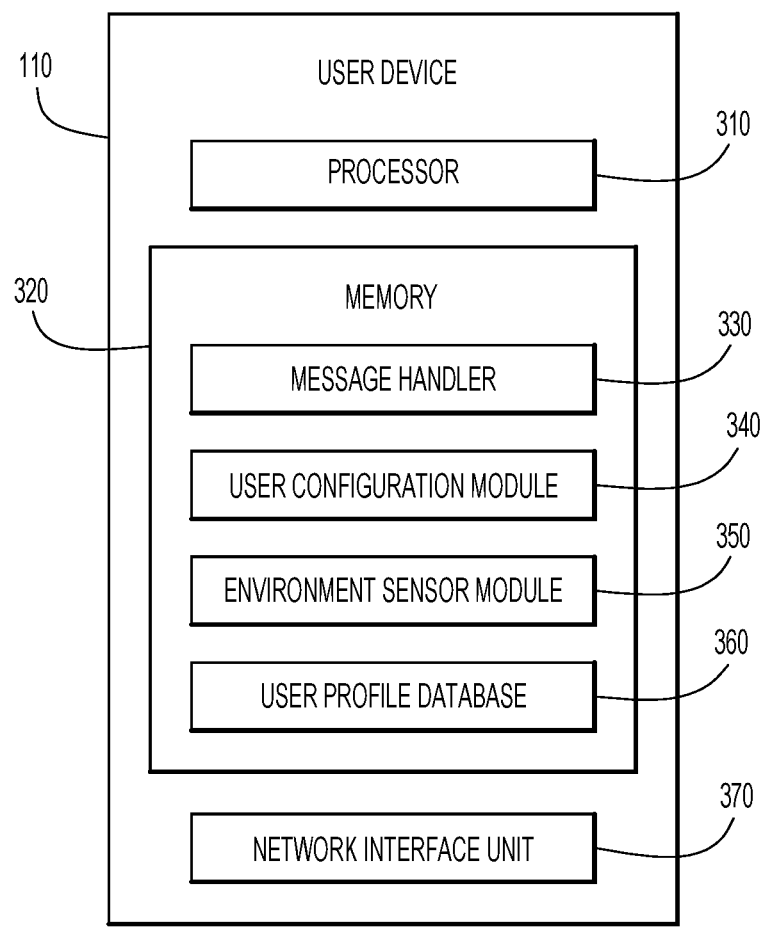
FIG. 3 is a block diagram illustrating the user device of FIG. 1 in more detail according to an embodiment of the present invention.

Reference is now made to FIG. 3, which shows an example block diagram of a user device 110 configured to receive and display modified message notifications according to present invention embodiments. It should be understood that there are numerous possible configurations for user device 110 and FIG. 3 is meant to be an example of one of the possible configurations. User device 110 includes a processor 310, memory 320 and a network interface unit 370. The network interface (I/F) unit (NIU) 370 is, for example, an Ethernet card or other interface device that allows user device 110 to communicate over communication network 160. Network I/F unit 370 may include wired and/or wireless connection capabilities.

Processor 310 may include a collection of microcontrollers and/or microprocessors, for example, each configured to execute respective software instructions stored in the memory 320. Memory 320 may include various modules for execution by processor 310, including message handler 330, user configuration module 340, environment sensor module 350, and user profile database 360. Portions of memory 320 (and the instructions or modules therein) may be integrated with processor 310.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 320 may comprise one or more computer readable storage media (e.g., a memory device) encoded with software comprising computer executable instructions and when the software is executed (e.g., by processor 310) it is operable to perform the operations described herein. For example, memory 320 stores or is encoded with instructions for message handler 330 to perform overall control of the receiving and displaying operations of modified message notifications described herein by receiving one or more inputs from multiple components, including user configuration module 340, environment sensor module 350, and user profile database 360. Message handler 330 is further configured to send one or more user configuration parameters and/or preferences and one or more environmental parameters to server 130 to enable server 130 to determine, based on the received parameters and/or preferences, whether to modify one or more message notifications prior to sending the message notifications to message handler 330 for display on user device 110.

User configuration module 340 is configured to allow a user to set one or more security parameters and/or user preferences associated with the user and related to the display of message notifications on user device 110. Accordingly, user configuration module 340 allows a user to set a user security preference at various levels, e.g., (low, medium, high, blocked), such that incoming message notifications are modified in accordance with the user's security preference. For example, if a user security preference is set to a level of high, server 130 may modify an incoming message that "Mom fell down. Admitted to MGH," to "You have a critical health update," before forwarding the message notification to user device 110 for display on display 120. It should be understood that user configuration module 340 may use any input device and/or graphical user interface (GUI) to receive one or more security parameters and/or user preferences from a user associated with user device 110. For example, user configuration module 340 may display a slider-based GUI to a user associated with user device 110, allowing the user to vary one or more security parameters and/or user preferences based on the position of an arrow, cursor or other indicator within the corresponding slider-based GUI.

Environment evaluator module 350 is configured to detect and/or identify one or more environmental parameters associated with user device 110. For example, environment evaluator module 350 may determine, e.g., using Global Positioning Service (GPS) related data, the location associated with user device 110, (e.g., public, private, home) and/or identify the network to which user device 110 is connected, (e.g., public, private, home). Similarly, environment evaluator module 350 may also determine the number of screens on which user device is configured to display incoming message notifications, whether user device 110 is configured to share one or more of the screens with one or more additional users, and/or whether one or more screens associated with user device 110 are locked or configured to display drop-down previews of an incoming message notification. Environment evaluator module 350 may be further configured to determine the operational status of user device 110, (e.g., on, off).

Message handler 330, user configuration module 340 and environment evaluator module 350 may include one or more modules or units to perform the various functions of present invention embodiments described below. The various modules (e.g., message handler, user configuration module, environment evaluator module, etc.) may be implemented by any combination of any quantity of software and/or hardware modules or units, and may reside within memory 320 of user device 110 for execution by processor 310.

Memory 320 may further provide user profile database 360, which stores various information used and generated by message handler 330 for displaying one or more message notifications received from server 130 on user device 110. For example, user profile database 360 may store one or more characteristics or preferences associated with a user (e.g., security preferences, personal sensitivity, etc.), and/or one or more environmental parameters associated with device 110 (e.g., public environment, shared screen, screen unlocked, public network, etc.). User profile database 360 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Figure 4:
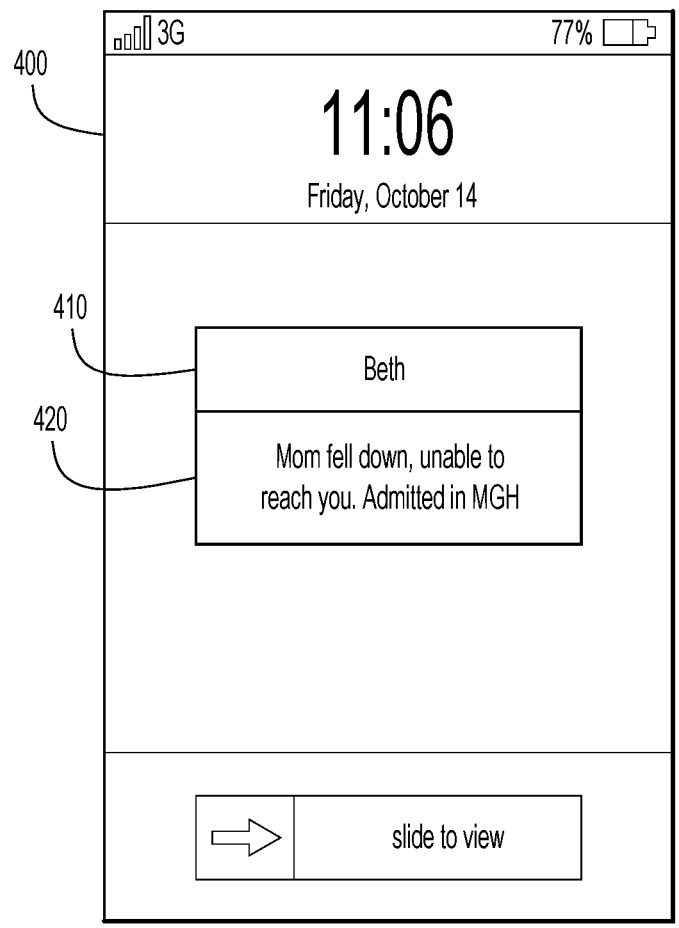
FIG. 4 is a diagrammatic illustration of an example notification of a personal message displayed on a user device.

A diagrammatic illustration of a message notification 400 displayed on user device 110 according to an embodiment of the present invention is illustrated in FIG. 4. By way of example, message notification 400 may include user name 410 and message body 420. For example, user name 410 may identify a user associated with user device 110 to which message notification 400 is directed, e.g., Beth, and message body 420 may include a message notification directed to the user, e.g., "Mom fell down, unable to reach you. Admitted in MGH." Initially, a user associated with user device 110 may pre-configure one or more security parameters and/or user preferences related to the display of message notifications on user device 110. For example, the user may pre-configure a preferred security level to low, and/or set one or more environmental parameters to indicate that user device 110 is in a private and/or secure location. Based on the preferred security level and/or one or more environmental parameters, server 130 may determine not to modify an incoming message directed to the user and may forward an unmodified message notification to user device 110 for display to the user. Accordingly, as shown in FIG. 4, message body 420 may therefore include contextual information that is the same as, or substantially similar to, the incoming message, e.g., "Mom fell down, unable to reach you. Admitted in MGH."

Figure 5:
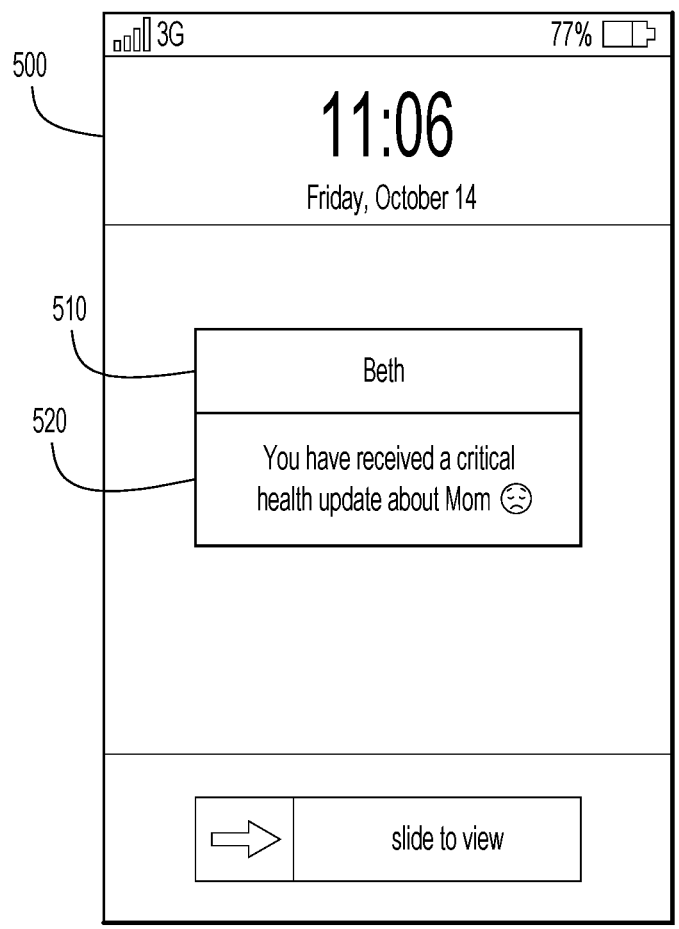
FIG. 5 is a diagrammatic illustration of an example modification to the personal message notification of FIG. 4 according to an embodiment of the present invention.

A diagrammatic illustration of a modified message notification 500 displayed on user device 110 according to an embodiment of the present invention is illustrated in FIG. 5. By way of example, message notification 500 may include user name 510 and message body 520. For example, user name 510 may identify a user associated with user device 110 to which message notification 500 is directed, e.g., Beth, and message body 520 may include a modified message notification directed to the user, e.g., "You have received a critical health update about Mom." As discussed above in reference to FIG. 4, a user associated with user device 110 may initially pre-configure one or more security parameters and/or user preferences related to the display of message notifications on user device 110. For example, the user may pre-configure a preferred security level to high, and/or set one or more environmental parameters to indicate that user device 110 is in a public or insecure location and/or has one or more shared screens. Based on the preferred security level and/or one or more environmental parameters, server 130 may determine to modify an incoming message directed to the user before forwarding a modified message notification to user device 110 for display to the user.

Accordingly, using NLP techniques, message context processor 140 may analyze an incoming message to determine a message content of an incoming message and identify a message sentiment associated with the incoming message, (business, personal, financial, critical, sensitive, colloquial, etc.). For example, when analyzing the message of FIG. 4, message context processor 140 may determine that the incoming message is personal and of a critical nature, e.g., concerning the health of the user's mother. Based on a pre-configured security level and/or one or more environmental parameters, server 130 may modify the incoming message to include a message summary (without personal and/or sensitive information) before forwarding a message notification to user device 110 for display. For example, server 130 may modify the incoming message such that message body 520 merely summarizes a critical health update message concerning the user's mother, as is shown in FIG. 5, thereby reducing the likelihood that embarrassing or comprising information will be inadvertently displayed on user device 110.

Figure 6:
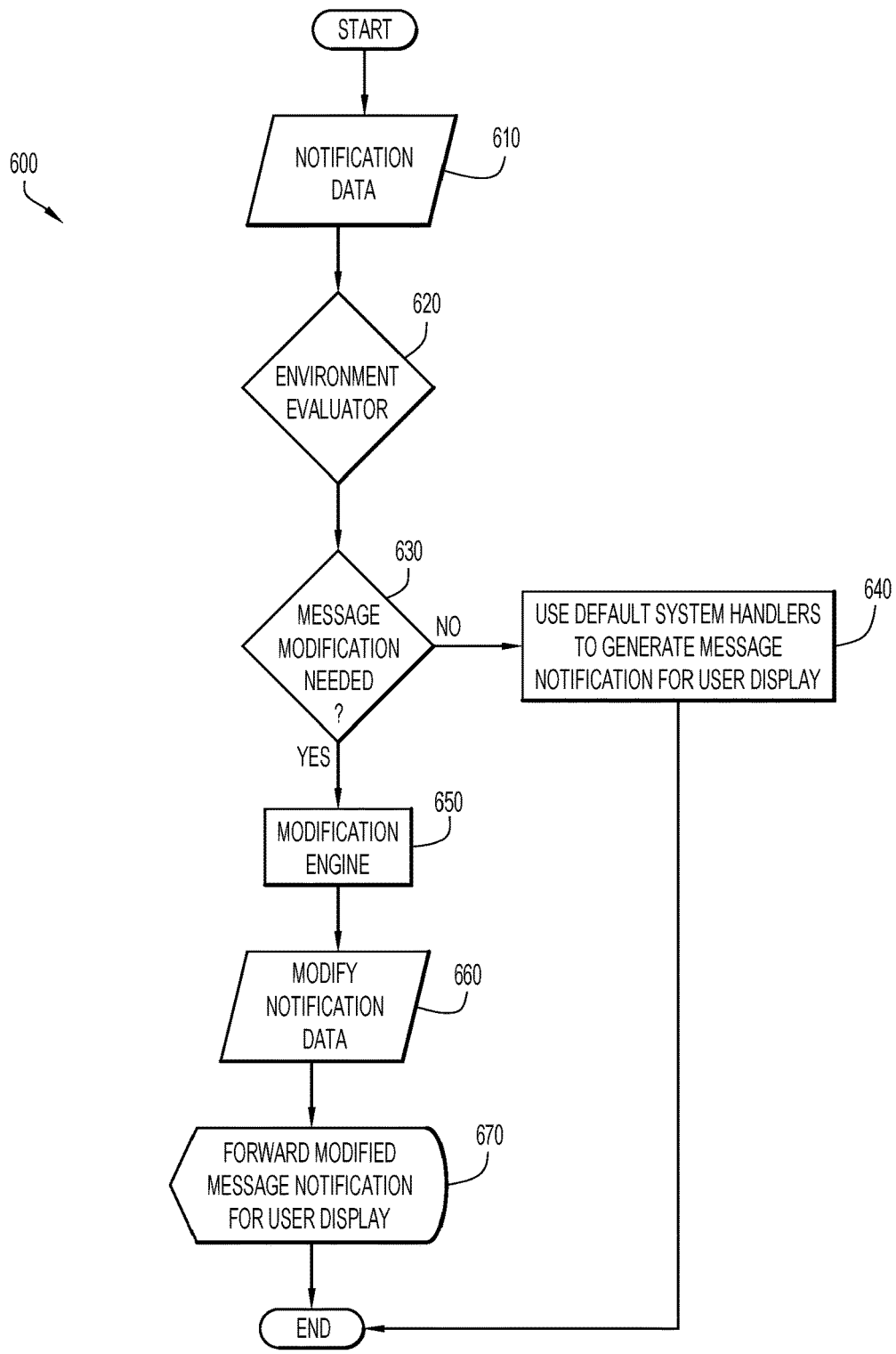
FIG. 6 is a high-level flow chart illustrating a manner in which an incoming message is modified in accordance with a user context according to an embodiment of the present invention.

With reference to FIG. 6, there is depicted a procedural flow chart illustrating a method 600 in which a message notification is generated based on an incoming message directed to a user of user device 110. Method 600 is performed primarily by message notification manager 230.

In accordance with method 600, user profile database 285 may be preconfigured with one or more security parameters and/or user preferences associated with a user and one or more environmental parameters associated with user device 110. Initially, server 130 may receive notification data at step 610, including an incoming message directed to a user associated with user device 110. In response to receiving the notification data, the notification data is analyzed to determine a message content and a message sentiment associated with the incoming message. For example, context analyzer 240 may, using NLP techniques, analyze the notification data to determine a message content associated with the incoming message and sentiment analyzer 260 may identify a message sentiment based on the determined message content.

Environment evaluator module 250 may analyze one or more pre-configured environmental parameters received from user device 110 and stored in user profile database 285 to identify an environment status associated with user device 110 at step 620. For example, environment evaluator module 250 may, based on one or more environmental parameters, determine that user device 110 is in a public or insecure location and/or has one or more shared screens. Based on the environment status and pre-configured user preferences or characteristics, e.g., a preferred security level, message notification manager 230 determines whether to modify the incoming message before forwarding a message notification to user device 110 for display to the user at step 630. According to a present embodiment, message notification manager 230 may set a modification indicator flag to TRUE if it is determined that the incoming message should be modified, or may set the modification indicator flag to FALSE if it is determined that the incoming message should not be modified.

If message notification manager 230 determines that the incoming message should not be modified, message notification manager 230, using default system handlers, generates a message notification including the incoming message and forwards the incoming message notification to user device 110 for display to the user at step 640 and method 600 ends.

When it is determined that the incoming message should be modified, based on the message content and the message sentiment associated with the incoming message, modification engine 270 may generate a modified message in accordance with the environment status associated with user device 110 and pre-configured user preferences or characteristics associated with the user at step 650. For example, if an environmental status indicates that user device 110 is in a public or insecure location and the message sentiment identifies the incoming message as personal or sensitive, modification engine 270 may generate a modified message that summarizes the incoming message to convey and/or indicate the meaning, i.e., gist, of the message to the user without explicitly disclosing sensitive or embarrassing information. Modification engine 270 may further modify the incoming message to include one or more symbols, pictures and/or colors indicating the message content of the incoming message, e.g., a smiling emoticon to indicate happiness, and/or a background color indicating the message sentiment associated with the incoming message, e.g., red to indicate anger.

Message notification manager 230 may generate message notification data that is directed to a user associated with user device 110 and include the incoming message modified by modification engine 270 at step 660. Server 130 may forward the generated message notification data to user device 110 for display to the user at step 670, and method 600 ends.

Figure 7:
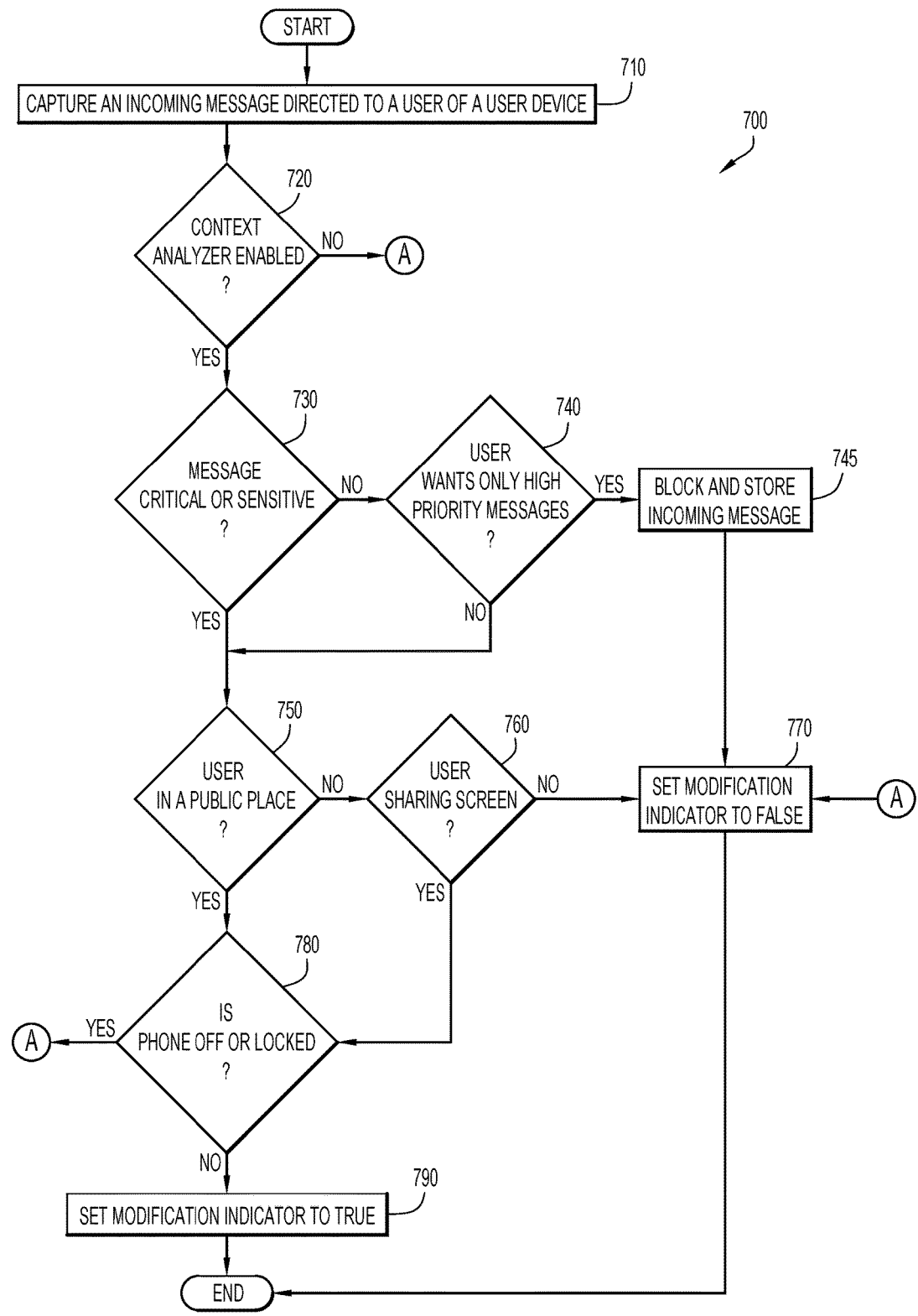
FIG. 7 is a procedural flow chart illustrating a manner in which user context is evaluated to determine whether a message should be modified according to an embodiment of the present invention.

With reference to FIG. 7, there is depicted a procedural flow chart illustrating a method 700 to determine whether a modification of the incoming message is needed (e.g., step 630 of FIG. 6) based on pre-configured user preferences, one or more environmental parameters, and an incoming message directed to a user associated with user device 110. Method 700 is performed primarily by message notification manager 230.

In accordance with method 700, user profile database 285 may be preconfigured with one or more user preferences. For example, the user profile information stored in user profile database 285 may include whether the user has requested or enabled message modification operations on server 130, whether the user has indicated that only high-priority messages should be delivered to user device 110, whether user device 110 is in a public place, whether the user is sharing one or more screens on user device 110, whether user device 110 is off or locked, etc.

Initially, server 130 receives one or more messages directed to a user associated with user device 110 at step 710. Message notification manager 230 retrieves user profile information from user profile database 285 to determine whether the user has enabled message modification operations on server 130 at step 720. When the user has not enabled message modification operations on server 130, method 700 ends.

When the user has enabled message modification operations on server 130, context analyzer 240, e.g., by using NLP processing techniques, determines whether the incoming message directed to the user is a critical or sensitive message, i.e., is a high priority message, at step 730.

When the message is critical or sensitive, message notification manager 230 retrieves user profile information from user profile database 285 to determine whether the user has requested that only high-priority messages be forwarded to user device 110 at step 740. If the user has requested that only high-priority messages be forwarded to user device 110, message notification manager 230 blocks the incoming message and stores the message in memory 220 for later delivery at step 745, and the modification indicator is set to FALSE at step 770 and method 700 ends.

Message notification manager 230 determines whether user device 110 is in a public location at step 750. If user device 110 is in a private location, message notification manager 230 determines whether the user is sharing one or more screens associated with user device 110 at step 760. If the user is not sharing one or more screens associated with user device 110, the modification indicator is set to FALSE at step 770 and method 700 ends.

Message notification manager 230 determines whether user device 110 is off or locked at step 780. If user device 110 is off or locked, the modification indicator is set to false at step 770 and method 700 ends.

Message notification manager 230 sets a modification indicator associated with the incoming message to FALSE, indicating that the incoming message should not be modified, and stores the modification indicator, e.g., in user profile database 285, at step 770 and method 700 ends.

Otherwise, message notification manager 230 sets a modification indicator associated with the incoming message to TRUE, indicating that the incoming message should be modified according to the message context and message sentiment associated with the incoming message, and stores the modification indicator, e.g., in user profile database 285, at step 790 and method 700 ends.

Figure 8:
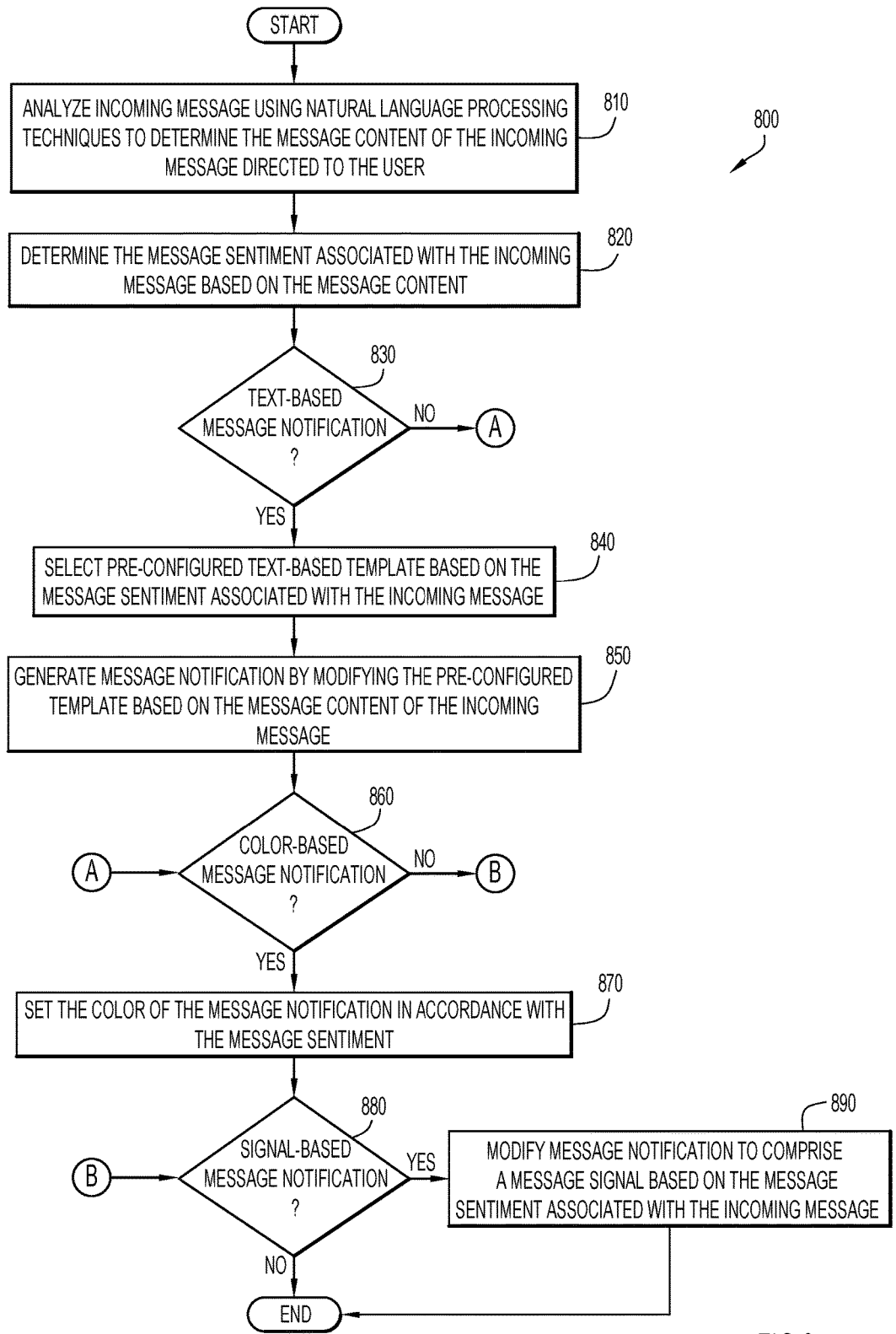
FIG. 8 is a procedural flow chart illustrating a manner in which an incoming message is modified in accordance with a user context according to an embodiment of the present invention.

With reference to FIG. 8, there is depicted a procedural flow chart illustrating a method 800 in which a message notification is generated (e.g., step 650 of FIG. 6) based on pre-configured user preferences, one or more environmental parameters, and an incoming message directed to a user of user device 110. Method 800 is performed primarily by message notification manager 230.

Initially, server 130 receives an incoming message directed to a user associated with user device 110 and, in response, context analyzer 240 analyzes the incoming message, e.g., using NLP techniques, to determine the message context associated with the incoming message at step 810. According to an embodiment of the present invention, context analyzer 240 may further identify a category and/or type of message associated with the incoming message directed to the user. Based on the determined message content, sentiment analyzer 260 determines the message sentiment and/or mood, e.g., personal, business, financial, critical, sensitive, etc., associated with the incoming message at step 820.

Message notification manager 230 retrieves user profile information from user profile database 285 to determine whether the user has enabled text-based message notifications at step 830.

If the user has enabled text-based message notifications, modification engine 270 selects a pre-configured text-based template based on the determined message sentiment associated with the incoming message at step 840. According to an embodiment of the present invention, modification engine 270 may select the pre-configured text-based template in accordance with the identified category or type of message associated with the incoming message. Modification engine 270 modifies the selected pre-configured template to generate a message notification based on the incoming message at step 850.

After a message notification is generated, or in response to text-based notification being disabled, message notification manager 230 retrieves user profile information from user profile database 285 to determine whether the user has enabled color-based message notifications at step 860.

If the user has enabled color-based message notifications, modification engine 270 selects and sets the background color of the message notification based on the determined message sentiment associated with the incoming message at step 870. According to an embodiment of the present invention, modification engine 270 may further select the background color of a message notification in accordance with the identified category or type of message associated with an incoming message.

After a color is selected, or in response to color-based notification being disabled, message notification manager 230 retrieves user profile information from user profile database 285 to determine whether the user has enabled signal-based message notifications, e.g., emoticons, pictures, symbols, etc., at step 880. If the user had not enabled signal-based message notifications, method 800 ends.

Otherwise, message notification manager 230 includes one or more symbols, pictures and/or emoticons in the generated message notification to further convey and/or indicate the message content and/or message sentiment associated with the incoming message at step 890 and method 800 ends.

Figure 9:
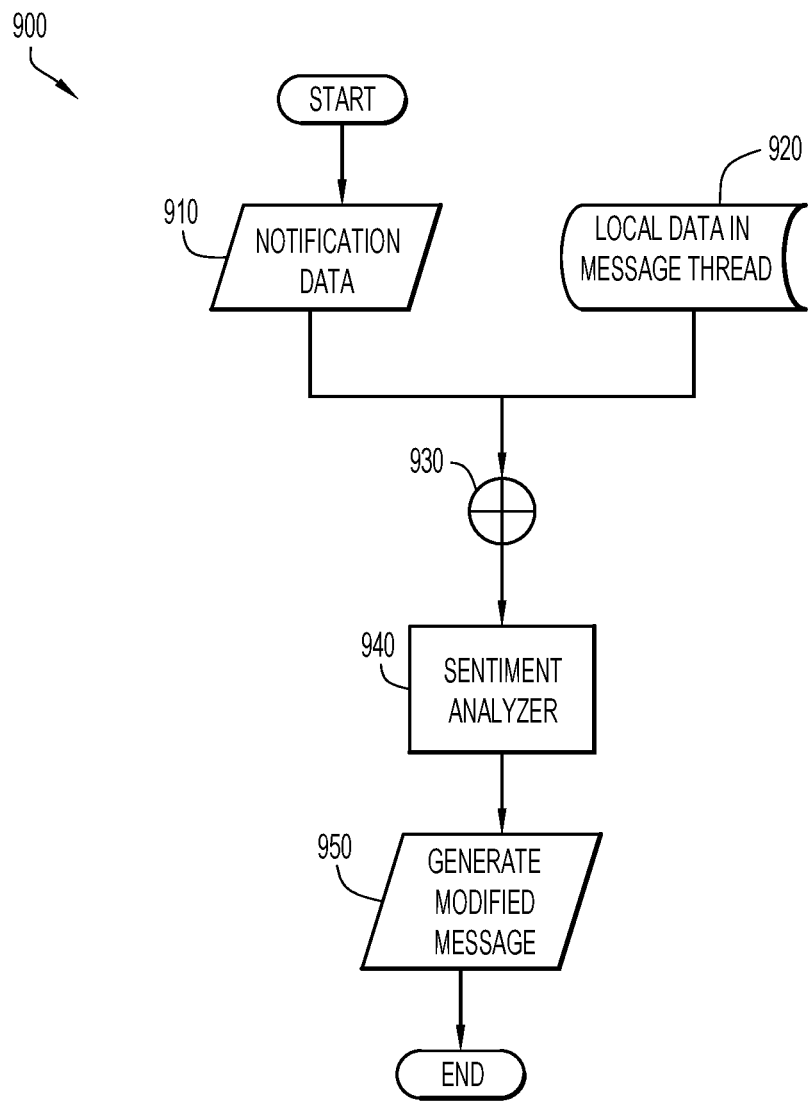
FIG. 9 is a procedural flow chart illustrating a manner in which an incoming message of a message thread is modified according to an embodiment of the present invention.

With reference to FIG. 9, there is depicted a procedural flow chart illustrating a method 900 in which a message notification is generated based on message thread data.

In accordance with method 900, memory 220 may store, e.g., in user profile database 285, one or more prior messages and/or message data comprising a message thread related to an incoming message directed to a user associated with user device 110.

At step 910, initially, server 130 may receive notification data including an incoming message directed to a user associated with user device 110.

At step 920, message notification manager 230 retrieves, e.g., from user profile database 285, message thread data associated with the received notification data. According to an embodiment of the present invention, the message thread data may comprise one or more prior messages and/or data related to the incoming message directed to the user.

At step 930, context analyzer 240 analyzes the received notification data along with the message thread data to determine a message content associated with the received notification data. According to an embodiment of the present invention, message notification manager 230 may update the message thread data to include the notification data and store the updated message thread data in memory 220, e.g., user profile database 285.

At step 940, sentiment analyzer 260 identifies a message sentiment associated with the incoming message based on the received notification data and the message thread data.

At step 950, modification engine 270 may generate a modified message notification based on the message content and message sentiment associated with the incoming message, and method 900 ends.

It will be appreciated that the embodiments described above and illustrated in the drawings represent only a few of the many ways of implementing embodiments for automated message modification based on message content and user context.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., message notification manager, sentiment analyzer, environment evaluator module, context analyzer, modification engine, etc.). These systems may include any types of monitors and input devices (e.g., keyboard, mouse, voice recognition, etc.) to enter and/or view information.

It is to be understood that the software (e.g., message notification manager, sentiment analyzer, environment evaluator module, context analyzer, modification engine, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., message notification manager, sentiment analyzer, environment evaluator module, context analyzer, modification engine, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store messages, message-related data, user preferences and/or characteristics and one or more environmental parameters (e.g., user device configuration settings, public/private location, network attributes, etc.). The database system may be implemented by any number of any conventional or other databases, data stores or storage structures (e.g., files, databases, data structures, data or other repositories, etc.) to store information (e.g., user device configuration settings, public/private location, network attributes, etc.). The database system may be included within or coupled to the server and/or client systems. The database systems and/or storage structures may be remote from or local to the computer or other processing systems, and may store any desired data (e.g., user device configuration settings, public/private location, network attributes, etc.).

The present invention embodiments may employ any number of any type of user interface (e.g., Graphical User Interface (GUI), command-line, prompt, etc.) for obtaining or providing information (e.g., messages, analytics, configurations, user or other preferences, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user (e.g., user device configuration settings, public/private location, network attributes, etc.).

The present invention embodiments are not limited to the specific tasks or algorithms described above, but may be utilized for any type of messages (e.g., personal, business, legal, financial, etc.) to perform any type of message modifications on any type of message modification device (e.g., computer, laptop, smartphone, server, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically modifying an incoming message based on user context comprising:
   analyzing an incoming message directed to a user to determine a message content associated with the incoming message, wherein analyzing the incoming message comprises determining a message sentiment associated with the message content;
   determining a user context based on one or more environmental parameters associated with the user;
   determining whether there is sensitive content in the incoming message based on the message content and user context; and
   in response to determining that there is sensitive content in the incoming message, generating a modified message by removing the sensitive content from the incoming message for display to the user, wherein generating the modified message comprises:
      selecting a pre-configured template based on the message sentiment; and
      revising the pre-configured template to include a summary of the message content.

2. The method of claim 1, wherein the one or more environmental parameters associated with the user one include one or more selected from a group of: a location of a user device associated with the user, a type of the user device, a type of network associated with the user device, a shared status of one or more screens associated with the user device and an operational status of the user device.

3. The method of claim 1, wherein the user context includes one or more selected from a group of: a security preference associated with the user, preferred categories of message notification, and a minimum priority level of a message notification.

4. The method of claim 1, wherein generating a modified message further comprises generating a background color based on the message sentiment.

5. The method of claim 1, further comprising:
   receiving feedback from the user based on the modified message; and
   updating one or more dictionaries based on the feedback received from the user.

6. A system for dynamically modifying an incoming message based on user context comprising:
   at least one processor configured to:
      analyze an incoming message directed to a user to determine a message content associated with the incoming message, wherein analyzing the incoming message comprises determining a message sentiment associated with the message content;
      determine a user context based on one or more environmental parameters associated with the user;
      determine whether there is sensitive content in the incoming message based on the message content and user context; and
      in response to determining that there is sensitive content in the incoming message, generate a modified message by removing the sensitive content from the incoming message for display to the user, wherein generating the modified message comprises:
         selecting a pre-configured template based on the message sentiment; and
         revising the pre-configured template to include a summary of the message content.

7. The system of claim 6, wherein the one or more environmental parameters associated with the user include one or more selected from a group of: a location of a user device associated with the user, a type of the user device, a type of network associated with the user device, a shared status of one or more screens associated with the user device and an operational status of the user device.

8. The system of claim 6, wherein the user context includes one or more selected from a group of: a security preference associated with the user, preferred categories of message notification, and a minimum priority level of a message notification.

9. The system of claim 6, wherein generating a modified message further comprises generating a background color based on the message sentiment.

10. A computer program product for modifying a message based on user context comprising:
    a computer readable storage medium having program instructions embodied therewith, the program instructions executable by at least one processor to cause the at least one processor to:
       analyze an incoming message directed to a user to determine a message content associated with the incoming message, wherein analyzing the incoming message comprises determining a message sentiment associated with the message content;
       determine a user context based on one or more environmental parameters associated with the user;
       determine whether there is sensitive content in the incoming message based on the message content and user context; and
       in response to determining that there is sensitive content in the incoming message, generate a modified message by removing the sensitive content from the incoming message for display to the user, wherein generating the modified message comprises:
          selecting a pre-configured template based on the message sentiment; and
          revising the pre-configured template to include a summary of the message content.

11. The computer program product of claim 10, wherein the one or more environmental parameters associated with the user include one or more selected from a group of: a location of a user device associated with the user device, a type of the user device, a type of network associated with the user device, a shared status of one or more screens associated with the user device and an operational status of the user device.

12. The computer program product of claim 10, wherein the user context includes one or more selected from a group of: a security preference associated with the user, preferred categories of message notification, and a minimum priority level of a message notification.

13. The computer program product of claim 10, wherein generating a modified message further comprises generating a background color based on the message sentiment.

* * * * *